July 15, 1952 R. R. CROOKSTON 2,603,100
YIELDABLE DRIVE FOR INDICATORS
Filed March 22, 1950 2 SHEETS—SHEET 2

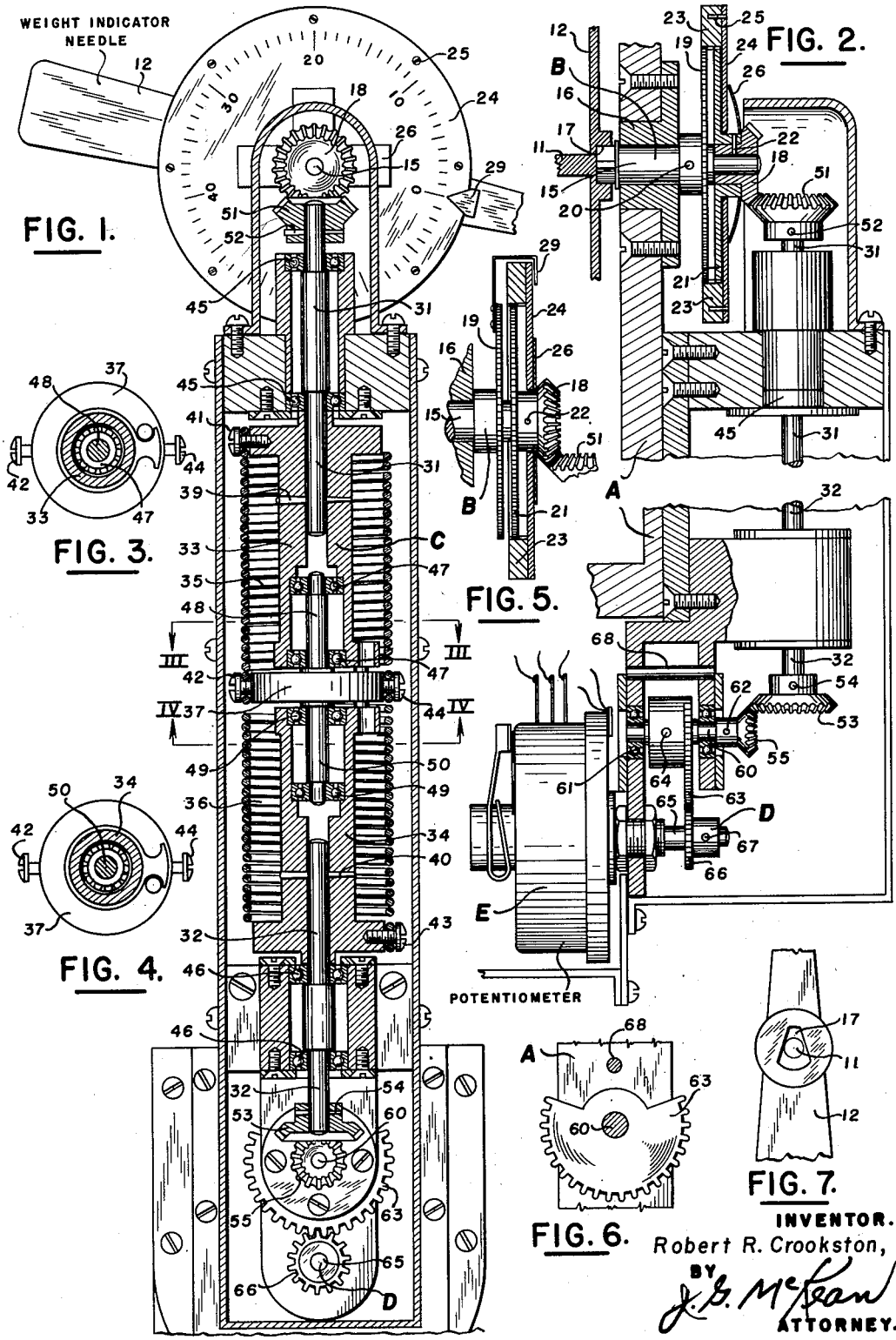

INVENTOR.
Robert R. Crookston,
BY J. G. McKean
ATTORNEY.

Patented July 15, 1952

2,603,100

UNITED STATES PATENT OFFICE 2,603,100

YIELDABLE DRIVE FOR INDICATORS

Robert R. Crookston, Houston, Tex., assignor, by mesne assignments, to Standard Oil Development Company, Elizabeth, N. J., a corporation of Delaware Application March 22, 1950, Serial No. 151,135

3 Claims. (Cl. 74—411)

1

This application is directed to a mechanism for using the angular movement of a pointer shaft to control the movement of another shaft.

As a specific application the mechanism may be attached to the shaft of a weight indicator for oil field drilling rigs so that it can apply to a potentiometer an angular movement which is proportional to movement of the weight indicator shaft, the potentiometer being part of a system which controls the rate of drilling. The mechanism of the present case has as features a system of gears arranged to transmit rotative motion from the weight indicator shaft to the potentiometer shaft, this system including a clutch assembly consisting of two portions, one of which is provided with a dial and the other of which carries a pointer; the system also includes two coaxial drive shafts journalled on a support and mechanically connected by at least one torsion spring to allow rotative movement between said two shafts.

Other objects and advantages of the present invention may be seen from the following description taken with the drawing in which Fig. 1 is an elevation, partly in section, showing an embodiment of the present invention attached to the weight indicator;

Fig. 2 is an elevation, partly in section, of the upper and lower portions of the device of Fig. 1, taken at a right angle to the view of Fig. 1;

Fig. 3 is a view taken along line III—III of Fig. 1;

Fig. 4 is a view taken along line IV—IV of Fig. 1;

Fig. 5 is a fragmentary view showing in greater detail parts shown in Figs. 1 and 2;

Fig. 6 is a fragmentary view showing in greater detail parts shown in Figs. 1 and 2;

Fig. 7 is a fragmentary view showing parts shown in Figs. 1 and 2;

Figures 8, 9:
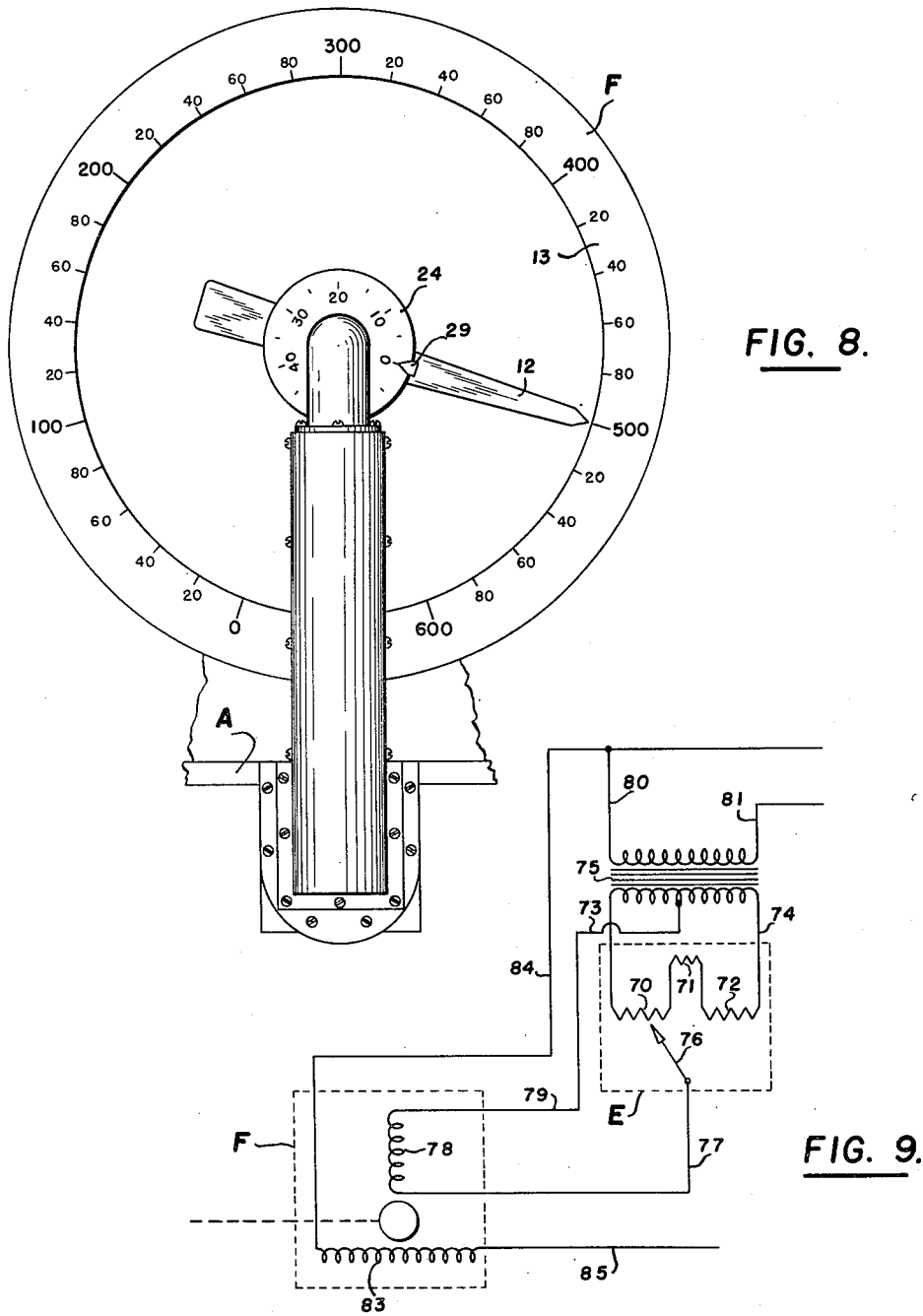
Fig. 8 is a front elevation of the end of the device of Figs. 1 and 2 showing its appearance as attached to a weight indicator.
Fig. 9 is in the form of a wiring diagram showing a potentiometer of Figs. 1 and 2 connected to a Servel motor.

Turning now specifically to the drawing and first to the mechanism of Figs. 1 to 8, the principal parts of the mechanism are a frame A, a pointer shaft assembly B, a drive shaft assembly C and a potentiometer drive assembly D. The potentiometer drive shaft assembly D drives potentiometer E. This assembly is mounted on a conventional weight indicator F.

By way of example, the weight indicator F

2 may be an electronic type although it will be understood that some other indicating instrument may be used provided that it has a drive shaft which moves angularly when there is the change in the value of the thing being measured.

The weight indicator F is provided with an indicator shaft 11 carrying a pointer 12 with a dial 13. It will be understood that the weight on the bit is indicated by the position of the end of pointer 12 with relation to the dial 13. The mechanism which causes movement of the shaft 11 does not, in itself, form any part of the present invention and for this reason is not shown or described.

In the mechanism of the present application the pointer shaft assembly B consists of a shaft 15 mounted to rotate in journal 16 which, in turn, is mounted on the frame A. The end of shaft 15 projecting from frame A toward the weight indicator has a projection of a substantially triangular shape which is adapted to fit into a similarly shaped groove 17 formed in the end of shaft 11 of the weight indicator. The other end of the shaft 15 is of reduced diameter and serves as a journal for gear 18.

A clutch is provided for connecting gear 18 with shaft 15 so that these two elements will rotate together. This clutch consists of gear 19 fastened to shaft 15 by pin 20, a gear 21 (which is similar to gear 19) mounted on gear 18 and fastened thereto by pins 22, a ring gear 23 having internal teeth which continually engage with the teeth of gear 21 and releasably engage with the teeth of gear 19, a face 24 secured to ring gear 23 by pins 25, and a spring member 26 biasing ring gear 23 to the left (as shown in Fig. 2) for keeping the ring gear 23 engaged with gear 19 as shown in Fig. 2. A pointer 27 is secured to member 19. The clutch is shown disengaged in Fig. 5.

The drive shaft assembly C has as its main elements upper shaft 31, lower shaft 32, upper spool 33, lower spool 34, upper torsion spring 35, lower torsion spring 36 and center connecting member 37. The upper shaft 31 is connected to upper spool 33 by pin 39 and the lower shaft 32 is connected to the lower spool 34 by pin 40. The upper end of torsion spring 35 is secured to upper spool 32 by means of screw 41 and its lower end is secured to connecting member 37 by screw 42. The lower end of the lower torsion spring 36 is secured to lower spool member 33 by screw 43 and the upper end of the lower torsion spring 36 is secured to connecting member 37 by screw 44.

Bearing assemblies 45 are mounted on frame A for supporting upper shaft 31 so that it may rotate freely and bearing assemblies 46 mounted on frame A similarly are arranged to support lower shaft 32. Bearing assemblies 47 are carried by upper spool 33 and support the upper shaft portion 48 of connecting member 38 and bearing assemblies 49 are mounted in lower spool member 34 for supporting the lower shaft portion 50 of connecting member 37. Thus, connecting member 37 is mounted on the spool members 33 and 34 for rotation with respect thereto while the spool members may rotate on shafts 31 and 32, respectively.

The upper end of shaft 31 of drive shaft assembly C has a beveled gear 51 secured thereto by pin 52. Beveled gear 51 meshes with beveled gear 18 of dial pointer shaft assembly B. The lower end of shaft 32 has a beveled gear 53 secured thereto by pin 54. Beveled gear 53 meshes with beveled gear 55 of potentiometer drive mechanism D.

The drive shaft assembly C with shafts 31 and 32 connected together through the medium of torsion springs 35 and 36 and member 37 provides a driving mechanism which transmits a corresponding motion from the pointer shaft to the potentiometer shaft when the force employed is less than a predetermined amount but which allows relative movement between the shafts 31 and 32 when the force exerted exceeds said predetermined amount.

The assembly D consists of a shaft 60 mounted on frame A by bearing assemblies 61. Beveled gear 55 is secured to an end of shaft 60 by pin 62. The portion of shaft 60 between the bearing assemblies 61 has a gear segment 63 mounted thereon and secured thereto by pin 64. Potentiometer E has a shaft 65 with gear 66 secured thereto by pin 67. The teeth of gear 66 mesh with the teeth of gear segment 63. Transversely extending member 68 is mounted on frame A and acts as a motion limiting element for gear segment 63.

A wiring diagram showing how potentiometer E may be used to control the operation of an electric motor is shown in Fig. 9. In this figure, potentiometer E has a resistance consisting of electrically connected units 70, 71, and 72. The resistance is connected through leads 73 and 74 to the secondary of a center tap transformer 75. Movable contact 76 of the potentiometer cannot make contact with center unit 71 of the resistance, so as long as it remains at or near its center position it makes no contact with the resistance but when it moves a predetermined distance away from the center point it makes contact with either section 70 or 72 of the resistance. The movable contact 76 of the potentiometer is connected through lead 77 to one end of a field coil 78 of motor F. By way of example, motor F may be a Servel motor. The other end of field coil 78 is connected through lead 79 to the center tap of transformer 75. The primary of transformer 75 is connected through leads 80 and 81 to a source of alternating potential 82 and the other field coil 83 of motor F may be connected through leads 84 and 85 to the source of an alternating current potential 82.

The device of the present application has a number of advantages. In a conventional weight indicator the shaft is not limited to a movement of no greater than 360°, and it may, in fact, rapidly make several revolutions at some phase in the drilling operation, as when the weight of the drill string is allowed to rest on the bottom of the hole or when the drill stem is being pulled out of the hole. However, it is preferable to employ a potentiometer E in which the angular movement of shaft 65 is limited to an arc of less than 360°. The mechanism of the present application allows pointer shaft 11 of the weight indicator to rotate for several revolutions without harm to the potentiometer. The over travel of the pointer shaft is compensated for by the torsion springs 35 and 36. For example, if the weight indicator shaft rotates in the clockwise direction, as viewed in Fig. 1, this motion is transmitted through assembly C to potentiometer shaft 66 until further movement of the latter is prevented by contact of one side of the gear segment 63 with stop member 68. Further movement of pointer shaft 11 causes upper torsion spring 35 to unwind, the torsion spring allowing the pointer shaft to rotate for several revolutions without harm to the device. When the direction of movement of the pointer shaft 11 is reversed, the first part of this movement allows torsion spring 35 to return to its initial position and thereafter the movement is transmitted through assembly C and causes the potentiometer shaft 67 to move in the reverse direction.

If the indicator shaft 11 is caused to move in the counterclockwise direction, as viewed in Fig. 1, this movement is initially transmitted through shaft assembly C to potentiometer shaft 66 until further movement is prevented by contact of gear segment 63 with stop member 68. When this occurs any additional movement of the pointer shaft 11 causes lower torsion spring 35 to unwind. When the pointer shaft 11 has reached its limit of movement in the counterclockwise direction and then starts to return to its initial position the first portion of said movement allows torsion spring 36 to rewind so that it assumes its initial position and thereafter additional movement of the pointer shaft causes movement of the potentiometer shaft 67.

The arrangement of a manually disengageable clutch between shaft 15 and drive shaft assembly C allows the potentiometer E to be set at any desired position (such as with contact 76 at the center of its arc of movement midway between sections 70 and 72) for a selected value of the weight indicator.

When the drilling with a rotary drilling rig is proceeding normally, the weight resting on the drill bit does not remain at a fixed value but fluctuates somewhat. As long as the weight remains within some range no change in the controls of the drilling rig should be made, but when this range is exceeded, an adjustment should be made. The apparatus of the present application may be used advantageously with a weight control unit for a rotary drilling rig inasmuch as it enables some range of weight to be selected for the drilling operation, and as long as the weight remains in this range there is no adjustment of the controls. In this way the range of weight to be carried by the drill bit may be readily changed as drilling conditions change, and the tendency of the control system to overcontrol or hunt is greatly reduced or avoided.

While I have disclosed a preferred embodiment of the present invention, it will be evident to a workman skilled in the art that changes in the sizes, shapes, and proportions of the parts thereof may be made without departing from the scope of the invention.

Having described the present invention by reference to a preferred embodiment thereof, what I desire to claim as new and useful and to secure by Letters Patent is:

1. A transmission for transferring movement from a rotatable pointer shaft comprising, in combination, a frame, a rotatable driven shaft mounted on said frame, a first shaft journalled on the frame adapted to be mounted coaxial with and in engagement with the pointer shaft from which movement is to be transmitted, a first gear, a clutch assembly releasably connecting said first shaft with said first gear, said assembly including a first element fixed to said gear and provided with a dial and a second element fixed to said shaft and provided with a pointer, a drive shaft journalled on said frame including second and third coaxial shafts, a connecting member between said second and third shafts, a first torsion spring connecting the second shaft with said connecting member and a second torsion spring connecting said third shaft to said connecting member, a stop member mounted on said frame, a second gear fixed on one end of the drive shaft meshing with said first gear and a train of gears mounted on said frame, one of which is fixed to the other end of said drive shaft connecting the drive shaft with said rotatable driven shaft, said train of gears including a rotatable member having arcuately separated stop surfaces arranged for separately contacting said stop member.

2. A transmission for transferring movement from a rotatable pointer shaft comprising, in combination, a frame, a first shaft mounted on the frame adapted to be placed coaxially with and in engagement with said pointer shaft, a rotatable driven shaft, a stop member mounted on said frame, a system of gears mounted on the frame arranged to transmit rotative motion from said first shaft to said rotatable driven shaft, said system including a clutch assembly mounted on said frame consisting of two portions, one of which is provided with a dial and the other of which carries a pointer, two coaxial drive shafts journalled on said frame and mechanically connected by at least one torsion spring to allow rotative movement between said two shafts, and a shaft journalled on said frame carrying a projecting member defining arcuately separated surfaces arranged for separately contacting said stop member.

3. A transmission for transferring movement from a rotatable pointer shaft comprising, in combination, a frame, a first shaft mounted on the frame adapted to be placed coaxially with and in engagement with said pointer shaft, a rotatable driven shaft, a fixed stop member mounted on said frame, a system of gears and shafts mounted on the frame arranged to transmit rotative motion from said first shaft to said rotatable driven shaft, said system including a clutch assembly mounted on said frame consisting of two portions, one of which is provided with a dial and the other of which carries a pointer, two coaxial drive shafts journalled on said frame and mechanically connected by at least one torsion spring to allow rotative movement between said shafts, and a movable stop member mounted on a shaft in the system between the torsion spring and said rotatable driven shaft, said movable stop member defining arcuately separated surfaces arranged for separately contacting said fixed stop member.

ROBERT R. CROOKSTON.

REFERENCES CITED

The following references are of record in the file of this patent:

UNITED STATES PATENTS

| Number | Name | Date |
|---|---|---|
| 606,525 | Dunning | June 28, 1898 |
| 1,966,246 | Jackson | July 10, 1934 |
| 1,994,629 | Arkema | Mar. 19, 1935 |

FOREIGN PATENTS

| Number | Country | Date |
|---|---|---|
| 463,809 | France | Dec. 27, 1913 |